United States Patent
Stephan et al.

(10) Patent No.: US 8,496,215 B2
(45) Date of Patent: Jul. 30, 2013

(54) ELBOW BRACKET FOR AERONAUTICAL EQUIPMENT

(75) Inventors: Marc Stephan, Melun (FR); Michel Henri Ziegler, Vert Le Grand (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/258,167

(22) PCT Filed: Apr. 22, 2010

(86) PCT No.: PCT/EP2010/055383
§ 371 (c)(1),
(2), (4) Date: Nov. 3, 2011

(87) PCT Pub. No.: WO2010/122122
PCT Pub. Date: Oct. 28, 2010

(65) Prior Publication Data
US 2012/0037764 A1    Feb. 16, 2012

(30) Foreign Application Priority Data
Apr. 24, 2009   (FR) ...................................... 09 52685

(51) Int. Cl.
*A47B 96/00* (2006.01)
*A47K 1/00* (2006.01)
*A47K 5/00* (2006.01)
*E04G 3/00* (2006.01)

(52) U.S. Cl.
USPC ............ 248/225.21; 248/221.11; 248/222.52; 248/224.8

(58) Field of Classification Search
USPC ............... 248/221.11, 222.52, 224.8, 225.21, 248/309.1, 235, 247
See application file for complete search history.

(56) References Cited

U.S. PATENT DOCUMENTS 5,339,967 A * 8/1994 Valiulis ........................ 211/57.1
7,111,813 B2 * 9/2006 Lin ............................... 248/239

FOREIGN PATENT DOCUMENTS

FR          2 914 275         10/2008

OTHER PUBLICATIONS

U.S. Appl. No. 13/265,059, filed Oct. 18, 2011, Ziegler.
International Search Report issued Jul. 20, 2010, in Patent Application No. PCT/EP2010/055383.

* cited by examiner

*Primary Examiner* — Amy J Sterling
(74) *Attorney, Agent, or Firm* — Oblon, Spivak, McClelland, Maier & Neustadt, L.L.P.

(57) ABSTRACT

An elbow bracket for cables or pipes, supported by a structure of an aeronautical device, in which a reinforcing rib of the elbowed main plate is not assembled with the elbowed main plate by welding but by tightening following a twisting of end-pieces traversing slots of the main plate and causing an outer face of the plate to be trapped against an upper face of oblong slits partially cutting into the end-pieces. The support is faster to construct, and has sufficient resistance.

4 Claims, 3 Drawing Sheets

ELBOW BRACKET FOR AERONAUTICAL EQUIPMENT

BACKGROUND OF THE INVENTION

1. Field of the Invention

The invention relates to an elbow bracket for aeronautical equipment.

2. Description of the Related Art

Aeronautical devices such as turbomachines often include a quantity of auxiliary equipment surrounding them, notably electrical power cables and cables for transmission of signals and commands, and also fluid conveyance pipes, which must be kept close to the device. Elbow brackets are typically used, one side of which is attached to the structure of the device by bolts and the other end of which carries the cables, pipes and other elements by collars, pairs of spring plates or other means. Since these supports are generally produced by bending metal plates, they are of poor rigidity and they must be reinforced by ribs attached to both sides of the plate by edges. The ribbing is traditionally welded to the plate by a continuous bead or by points, which has the disadvantage that it greatly increases manufacturing times and increases the cost of these supports. The fundamental aim of the invention is to replace the welded connection of the ribs to the main plate of the supports by a connection which is simpler to establish.

BRIEF SUMMARY OF THE INVENTION

In a general form, the invention relates to an elbow bracket for aeronautical equipment, including a main plate which has a side for attaching to a supporting structure and a side supporting the equipment, together with a reinforcing rib attached to inner faces of the said sides by edges, characterised in that the rib is separate from the main plate (i.e. it remains a separate solid, in the absence of any welding or any close connection between them) and includes end-pieces traversing slots of the said plate, where the end-pieces are partially cut into by oblique slits partially extending in the slots to bottom portions of the slits and partially outside the slots, above external faces of the said sides, to emerging portions of the slits, where the end-pieces are twisted at end portions and extend beyond the slots as they engage on the external faces of the said sides.

The reinforcing rib is thus adjusted to the main plate of the support simply by twisting the end-pieces, which can be done using a common tool. Combined with the direction and position of the slits, this twist leads the rib to be trapped on the main plate, although they remain separate from one another, but the assembly is sufficiently robust.

BRIEF DESCRIPTION OF THE DRAWINGS

The invention will now be described in greater detail by means of the following figures.

DETAILED DESCRIPTION OF THE INVENTION

Figure 1:
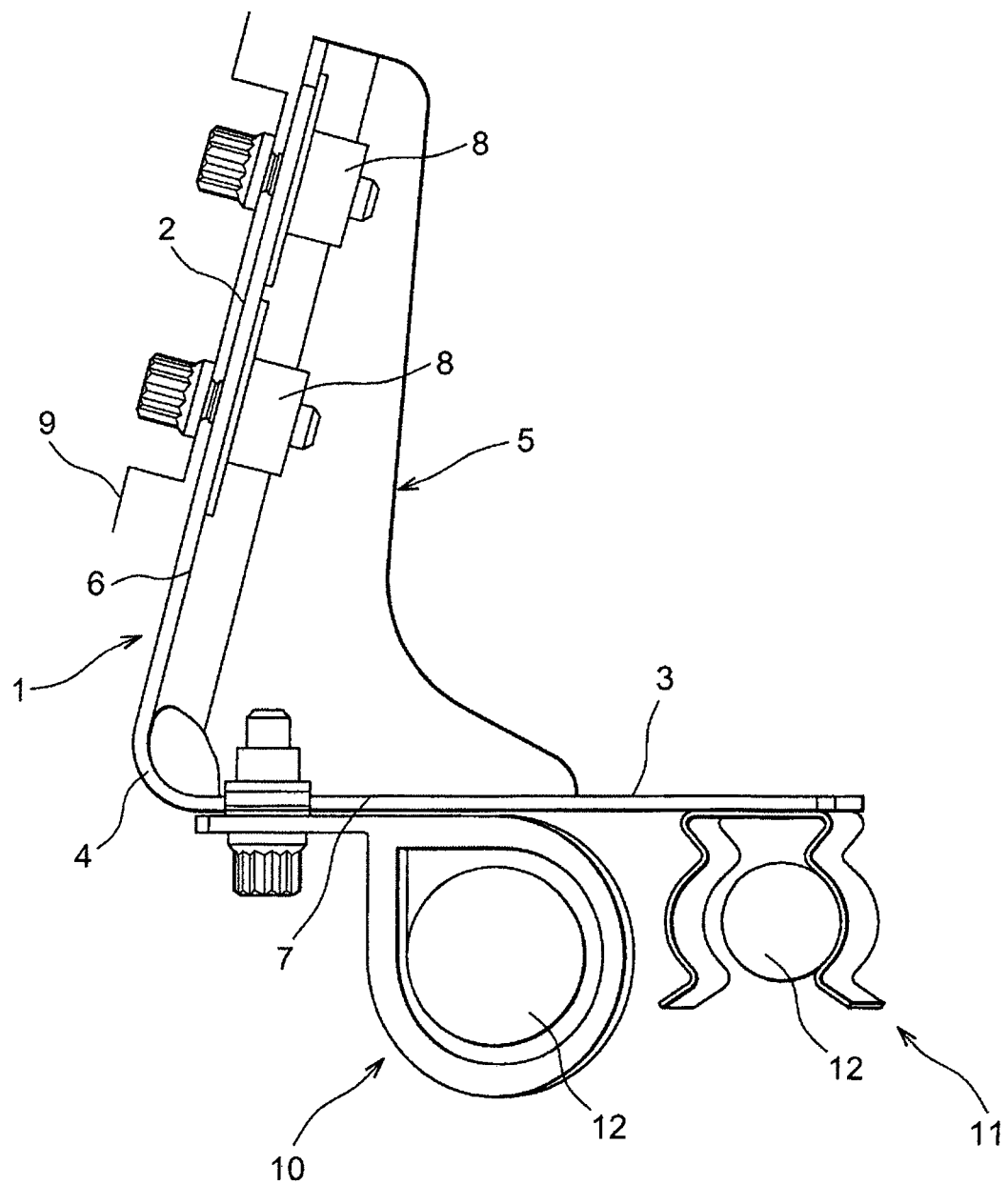
FIG. 1 is a general view of a traditional support, and the other figures illustrate the invention.

The support of FIG. 1 includes a main plate 1 consisting of a first side 2 and a second side combined with an angle 4 making a square edge or having another angle value. Sides 2 and 3 are still combined by a reinforcing rib 5 which presses on to them by means of two edges, respectively 6 and 7. The connection is made by welds. One of the sides 2 has bolts 8 for attachment to a structure 9 of an aeronautical device, and the second side 3 carries, in this particular embodiment, a collar 10 and a clamp 11 with two opposing spring plates to hold cables or pipes 12.

Figure 2:
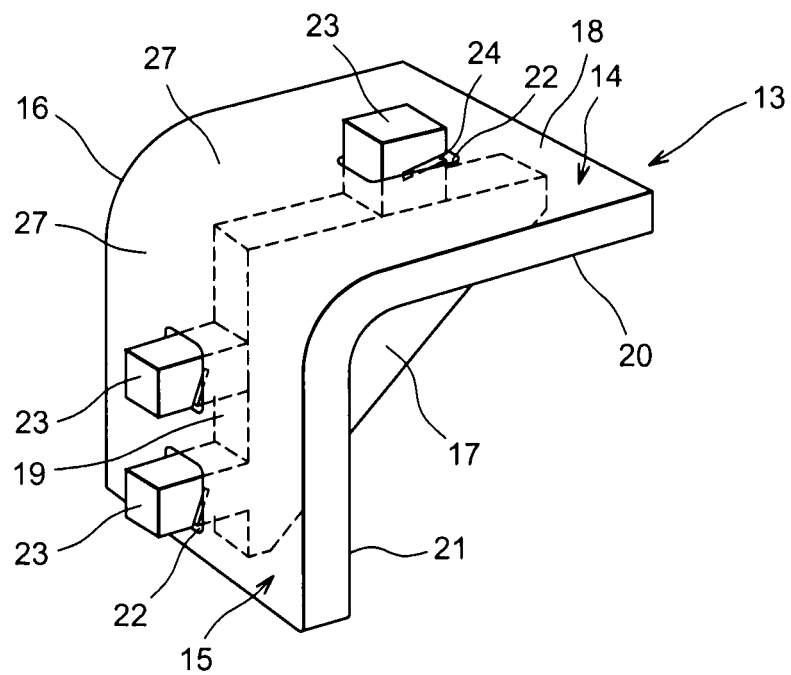
FIG. 2 is a general view of the invention.

The invention is firstly represented in FIG. 2. It also includes a main plate 13 consisting of two sides 14 and 15 attached to a corner 16, and a reinforcing rib 17, the edges of which, 18 and 19, are pressing on respective inner faces 20 and 21, in the concave part of the main plate 13, of its sides 14 and 15. The contact of edges 18 and 19 is however a simple pressing action, without any welding. The main plate 13 has three slots 22, one of which is made through the first side 14, and the other two through the second side 15; and rib 17 has the same number of end-pieces 23, passing respectively through the slots 22. One of them therefore protrudes from edge 18 and the other two from edge 19.

Figure 3:
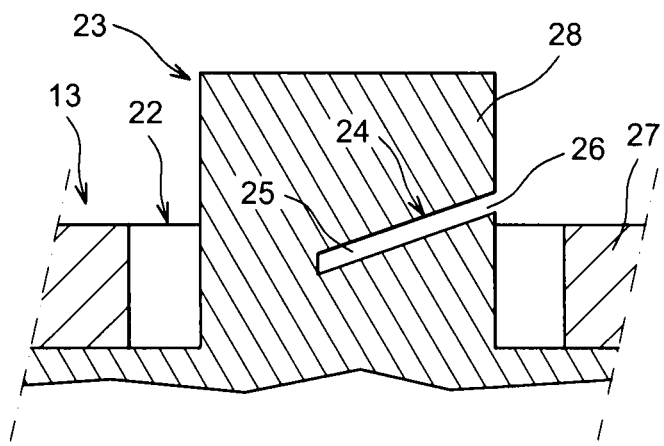
FIG. 3 is a detailed view of the assembly of the rib to the main plate, taken from the side of the plate.
Figure 4:
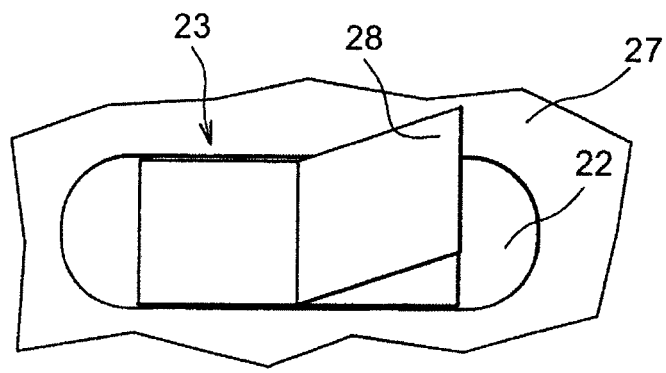
FIG. 4 is a view comparable to the previous one, taken from opposite the plate.
Figure 4A:
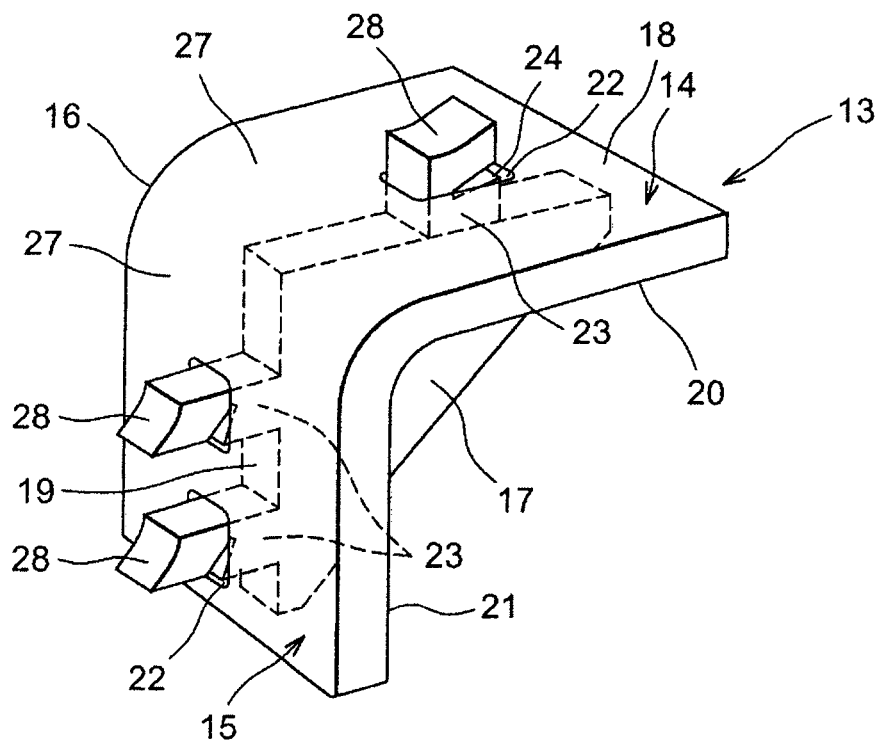
FIG. 4A is a general view of the invention after the ends of the end pieces are twisted.

Certain construction details will be described by means of FIG. 3. Each of the end-pieces 23 is partially cut into by a slit 24, the direction of which is oblique and the position of which is chosen such that a bottom portion 25 of the slit 24 extends in the slot 22, but such that an emerging portion 26 extends out of this slot 22, above the outside face 27 of one of the sides 14 or of the other 15 of the main plate 13, when edge 18 or 19 is pressed on to the inner face 21 or 22. The twisting of one end 28 of the end-piece 23, above the slit 24, therefore moves it to the side of the slot 22 in such a way that a portion extends above the outer face 27, which has also been represented in FIGS. 4 and 4A. The friction produced by the upper face of the slit 24 on the outer face 27 leads edge 18 or 19 to be trapped on the inner face 20 or 21, and therefore holds the rib 17 in place on the main plate 13.

The support is unchanged compared with the traditional design as regards the attachment to the structure 9 of the device and to the pipes 12. The respective fastenings are on one or other of the sides 14 and 15.

Although the cohesion between the main plate 13 and the rib 17 appears to be less than with a weld, it has been observed that the resistance of the present assembly also gave the support equally satisfactory rigidity. It is however preferable that there should be three slots and end-pieces, as has been represented, in order for the assembly to be sufficiently firm, isostatic but without any wavering. Another construction precaution consists in being able to make the slots 22 oblong in shape, having a greater length in an alignment direction (parallel to that of edges 18 and 19), in such a way that there are plays in the slots 22, around the end-pieces 23, which are greater in this lengthening direction than in the perpendicular direction, which is clearly shown in FIG. 2. It is then easier to position the rib 17.

The invention claimed is:

1. An elbow bracket for aeronautical equipment, comprising:

a main elbowed plate including a side to be attached to a supporting structure and a side for carrying equipment; and a reinforcing rib attached to said bracket and comprising edges contacting inner faces of said sides of said main plate, wherein the reinforcing rib is separate from the main plate, and said edges of the reinforcing rib include end-pieces traversing slots of the plate, the end-pieces are partially cut into by oblique slits, said oblique slits comprising bottom portions extending in the slots and emerging portions extending outside the slots, above outer faces of the sides, and wherein the end-pieces are twisted at end portions beyond the slits and said end portions protrude aside the slots and engage on the outer faces of the sides.

2. An elbow bracket for aeronautical equipment according to claim 1, wherein the slots are aligned and oblong, lengthened in a direction of alignment of the slots, and wherein plays in the slots and around the end-pieces are larger in the alignment direction than in a perpendicular direction.

3. An elbow bracket for aeronautical equipment according to claim 1, wherein there are three slots and three end-pieces, two of which are on one of the sides and one of which is on the other side.

4. An elbow bracket for aeronautical equipment according to claim 2, wherein there are three slots and three end-pieces, two of which are on one of the sides and one of which is on the other side.

* * * * *

UNITED STATES PATENT AND TRADEMARK OFFICE
CERTIFICATE OF CORRECTION

| | |
|---|---|
| PATENT NO. | : 8,496,215 B2 |
| APPLICATION NO. | : 13/258167 |
| DATED | : July 30, 2013 |
| INVENTOR(S) | : Marc Stephan et al. |

It is certified that error appears in the above-identified patent and that said Letters Patent is hereby corrected as shown below:

In the Specification

Column 1, line 66, change "second side combined" to --second side 3 combined--.

Signed and Sealed this
Fifth Day of November, 2013

Teresa Stanek Rea
*Deputy Director of the United States Patent and Trademark Office*